(12) United States Patent
Ku (10) Patent No.: US 12,153,999 B2
(45) Date of Patent: Nov. 26, 2024

(54) SCANNING METHOD AND ELECTRONIC DEVICE

(71) Applicant: Rayprus Technology (Foshan) Co., Ltd., Foshan (CN)

(72) Inventor: Ping-Han Ku, New Taipei (TW)

(73) Assignee: Rayprus Technology (Foshan) Co., Ltd., Foshan (CN)

( * ) Notice: Subject to any disclaimer, the term of this patent is extended or adjusted under 35 U.S.C. 154(b) by 0 days.

(21) Appl. No.: 18/227,312

(22) Filed: Jul. 28, 2023

(65) Prior Publication Data

US 2024/0220753 A1 Jul. 4, 2024

(30) Foreign Application Priority Data

Dec. 28, 2022 (CN) .......................... 202211695777.5

(51) Int. Cl.
*G06K 7/14* (2006.01)
*G06T 7/70* (2017.01)
*G06V 10/25* (2022.01)
*G06V 10/60* (2022.01)
*H04N 23/60* (2023.01)

(52) U.S. Cl.
CPC .............. *G06K 7/1443* (2013.01); *G06T 7/70* (2017.01); *G06V 10/25* (2022.01); *G06V 10/60* (2022.01); *H04N 23/64* (2023.01); *G06T 2207/30242* (2013.01); *G06V 2201/07* (2022.01)

(58) Field of Classification Search
CPC ........ G06K 7/1443; G06T 7/70; G06V 10/25; G06V 10/60; H04N 23/64

USPC ....................................................... 235/462.01
See application file for complete search history.

(56) References Cited

U.S. PATENT DOCUMENTS

| | | | | |
|---|---|---|---|---|
| 5,831,674 A | * | 11/1998 | Ju | ............................ G11C 8/12 |
| | | | | 348/302 |
| 7,108,187 B2 | * | 9/2006 | Turvy, Jr. | ............. G06K 7/1491 |
| | | | | 235/462.08 |
| 7,137,556 B1 | * | 11/2006 | Bonner | ............ G07B 17/00661 |
| | | | | 235/472.01 |
| 2002/0162889 A1 | * | 11/2002 | Navon | ................. G06K 7/1456 |
| | | | | 235/462.14 |

FOREIGN PATENT DOCUMENTS

| CN | 110121880 | 8/2019 |
|---|---|---|
| CN | 112417918 | 2/2021 |

* cited by examiner

*Primary Examiner* — Ahshik Kim
(74) *Attorney, Agent, or Firm* — ScienBiziP, P.C.

(57) ABSTRACT

A scanning method, applied in an electronic device, is illustrated. The electronic device obtains a total number of barcodes, and uses a camera to photograph the barcodes to obtain a first image. The electronic device scans the first image, determining a first number of first scanned barcodes and first positions of the first scanned barcodes, and uses the camera with adjusted shooting parameter to photograph the barcodes to obtain a second image, and scans the barcodes of the second image to determines a second number of second scanned barcodes and the second positions of the second scanned barcodes. The electronic device calculates a first sum of the first number and the second number when the first positions are different from the second positions, and determines a target scanning result when the first sum is equal to the total number.

17 Claims, 5 Drawing Sheets

SCANNING METHOD AND ELECTRONIC DEVICE

This application claims priority to Chinese Patent Application No. 202211695777.5 filed on Dec. 28, 2022, in China National Intellectual Property Administration, the contents of which are incorporated by reference herein.

FIELD

The subject matter herein generally relates to an image recognition field, in particular, relates to a scanning method and an electronic device.

BACKGROUND

A barcode is a graphic identifier for expressing a set of information by arranging multiple black bars and blank spaces of different widths according to certain coding rules. Barcodes are usually produced by laser engraving. When scanning multiple barcodes, it is easily affected by light and it is difficult to scan the multiple barcodes at the same time. For example, different materials of the multiple barcodes (for example, PCB (Printed Circuit Board) made of steel sheets and flexible insulating substrates) result in different brightness of reflected light during scanning, and it is often necessary to purchase additional cameras or multiple scanners for scanning separately, and it is unable to use a single camera to scan the multiple barcodes at the same time, resulting in a low scanning efficiency and a high cost.

BRIEF DESCRIPTION OF THE DRAWINGS

Implementations of the present disclosure will now be described, by way of embodiment, with reference to the attached figures.

DETAILED DESCRIPTION

In order to facilitate understanding, some descriptions of concepts related to the embodiments of the present disclosure are given for reference.

It should be noted that in the present disclosure, "at least one" means one or more, and "multiple" means two or more than two. "And/or" describes an association relationship of associated objects, indicating that there can be three types of relationships, for example, A and/or B can mean: A exists alone, A and B exist simultaneously, and B exists alone, where A, B Can be singular or plural. The terms "first", "second", "third", "fourth", etc. (if any) in the description and claims of this disclosure and the drawings are used to distinguish similar objects, not to describe a particular order or sequence.

A barcode is a graphic identifier for expressing a set of information by arranging multiple black bars and blank spaces of different widths according to certain coding rules. Barcodes are usually produced by laser engraving. When scanning multiple barcodes, it is easily affected by light and it is difficult to scan the multiple barcodes at the same time. For example, different materials of the multiple barcodes (for example, PCB (Printed Circuit Board) made of steel sheets and flexible insulating substrates) result in different brightness of reflected light during scanning, and it is often necessary to purchase additional cameras or multiple scanners for scanning separately, and it is unable to use a single camera to scan the multiple barcodes at the same time, resulting in a low scanning efficiency and a high cost.

In order to solve a technical problem of low scanning efficiency when scanning multiple barcodes at the same time, and to better understand a scanning method and related equipment provided by the embodiment of the present disclosure, the following first describes an application scenario of the scanning method of the present disclosure.

Figure 1:
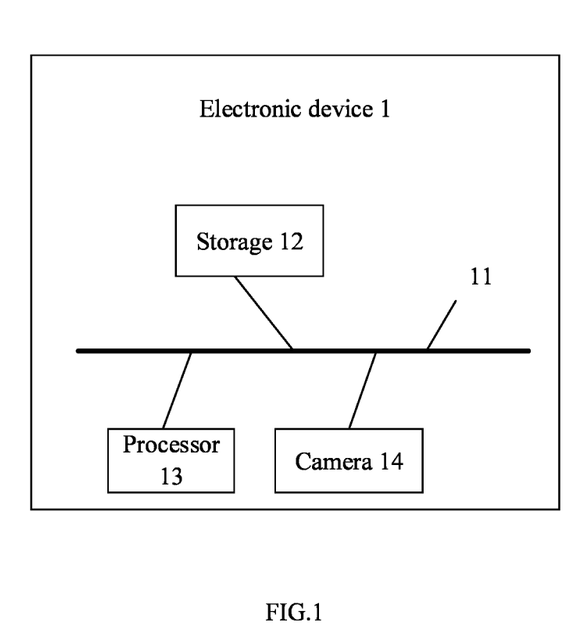
FIG. 1 is an application architecture diagram of an embodiment of a scanning method.

FIG. 1 illustrates an application architecture diagram of one embodiment of the scanning method. The scanning method is applied in an electronic device 1. The electronic device 1 includes, but is not limited to, a storage 12, at least one processor 13, and a camera 14 connected to each other by a communication bus 11.

In one embodiment, the electronic device 1 can be a mobile phone or a computer.

In one embodiment, the camera 14 can be a scanner, or a photographing device with a scanning function.

FIG. 1 is only an example of the electronic device 1, and FIG. 1 does not constitute a limitation to the electronic device 1. The electronic device 1 may include more or fewer components than shown in FIG. 1, or combine certain components, or different components, such as the electronic device 1 can also include input and output devices, network access devices, etc.

Figure 2:
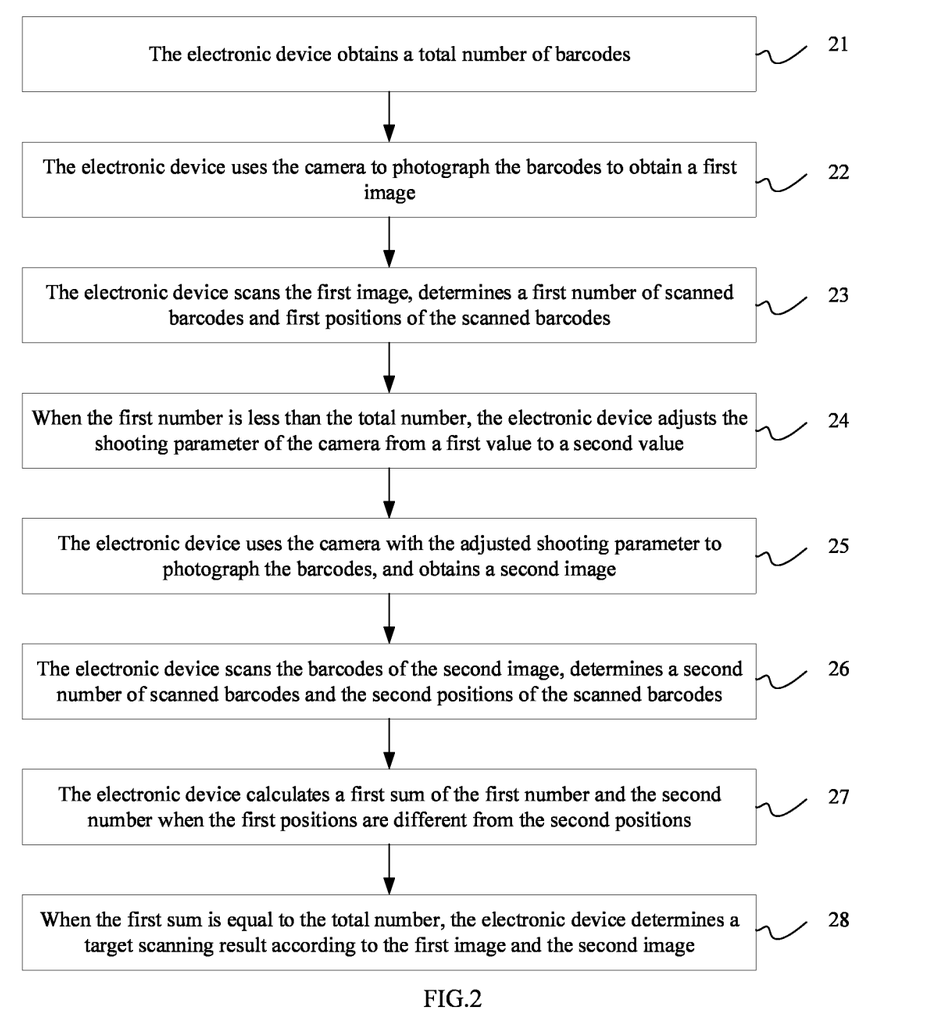
FIG. 2 is a flowchart of an embodiment of the scanning method.

FIG. 2 is a flowchart of the scanning method provided by an embodiment of the present disclosure, which is applied in the electronic device (for example, the electronic device 1 in FIG. 1). According to different requirements, an order of the steps in the flowchart can be changed, and some steps can be omitted.

At block 21, the electronic device obtains a total number of barcodes.

In some embodiments of the present disclosure, positions of the barcodes may be fixed, and the barcodes may be installed or pasted on different devices or equipment. The barcodes can be identified by using a preset target detection algorithm, and each of the barcodes is selected by a rectangular frame, and a number of all rectangular frames is calculated as the total number of the barcodes, so as to subsequently determine whether all barcodes have been scanned.

Specifically, the target detection algorithm may be one or more combination of a Long Short-Term Memory (LSTM) Network, a Recurrent Neural Network (RNN), and a Convolutional Neural Networks (CNN). The target detection algorithm is used to select each of the barcodes with a rectangular frame during a detection process. The position of the barcodes can be determined according to the position of the rectangular frames corresponding to the barcodes, and the total number of the barcodes can be determined according to the number of the rectangular frames.

At block 22, the electronic device uses the camera to photograph the barcodes to obtain a first image.

In some embodiments of the present disclosure, the camera may be a photographing device with a scanning function. Before scanning, the first image including a number of barcodes is photographed, and the first image contains all barcodes to be scanned. When photographing, all barcodes are within a shooting range of the camera, and the camera can be fixed at any position to shoot all barcodes.

If a resolution of image captured by the camera is lower than a preset resolution, the barcodes can be photographed again until the resolution of the image is greater than the preset resolution, and the image with a higher preset resolution is used as the first image, and a shooting parameter for shooting the first image is recorded.

At block 23, the electronic device scans the first image, determines a first number of scanned barcodes and first positions of the scanned barcodes.

In some embodiments of the present disclosure, after the first image is obtained, the first image is scanned to identify the barcodes in the first image. Each of the barcodes contains in relevant information of a device corresponding to the each of the barcodes, or include other custom information, for example, a string of numbers. After scanning the first image, if relevant information is displayed at a corresponding position of the barcode, it is considered that the barcode is successfully scanned, and the first number of the scanned barcodes and the first positions of the scanned barcodes are calculated.

Figure 3:
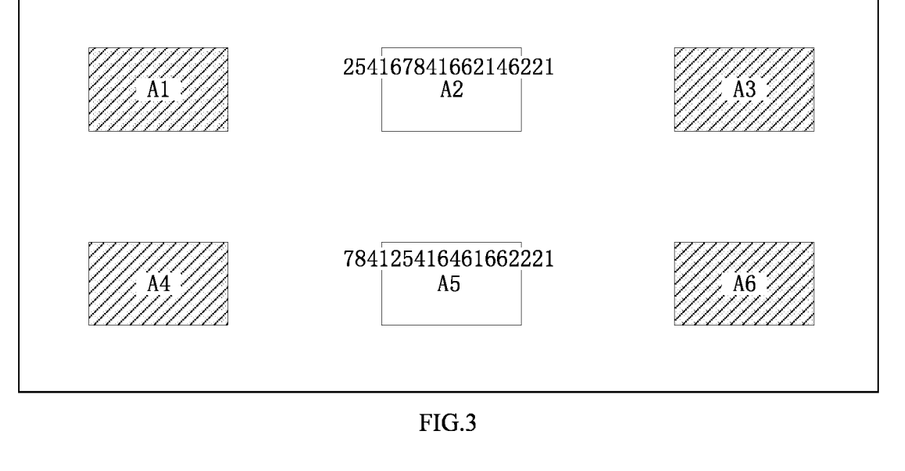
FIG. 3 is a schematic diagram of an embodiment of scanning a first image.

FIG. 3 is a schematic diagram of one embodiment of scanning the first image. As shown in FIG. 3, supposing each of the barcodes contains a series of numbers, and the numbers contained in each of the barcodes can be different. There are 6 barcodes and 6 positions corresponding to the 6 barcodes, which are position A1, position A2, position A3, position A4, position A5 and position A6. After scanning the first image, a second barcode and a fifth barcode are scanned, that is, a series of numbers appear at position A2 and position A5 respectively, therefore, the first number is 2, and the first positions include position A2 and position A5.

At block 24, when the first number is less than the total number, the electronic device adjusts the shooting parameter of the camera from a first value to a second value.

In some embodiments of the present disclosure, as shown in FIG. 3, the first number is 2, the total number is 6, and 2<6, that is, the first number is smaller than the total number, indicating that the shooting parameter at this time cannot identify all the barcodes. The electronic device stores the first image, the first number and the first positions when the first number is smaller than the total number. The electronic device adjusts the shooting parameter of the camera, and the shooting parameter includes multi-angle light intensity values. In one embodiment, the electronic device increases the multi-angle light intensity values, that is, the electronic device adjusts the shooting parameter from the first value to the second value, and the second value is greater than the first value.

Figure 4:
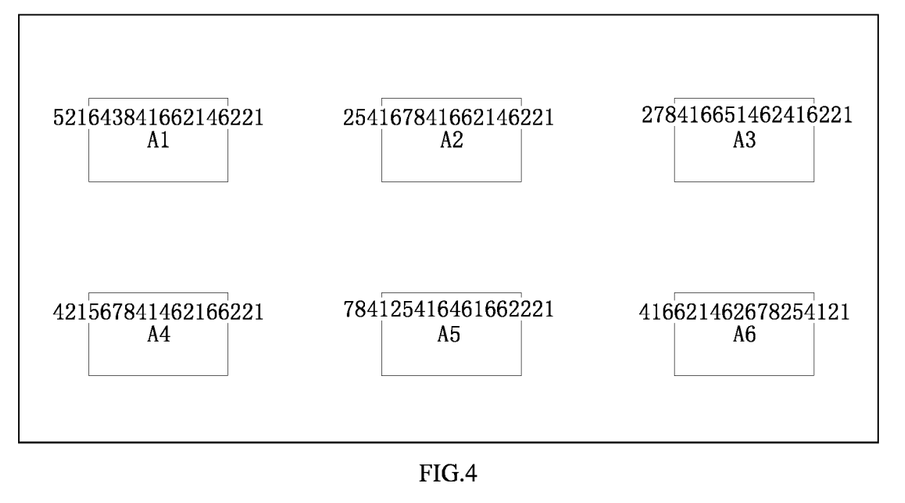
FIG. 4 is a schematic diagram of another embodiment of scanning the first image.

FIG. 4 is a schematic diagram of another embodiment of scanning the first image. As shown in FIG. 4, there are 6 barcodes and 6 corresponding positions, which are respectively position A1, position A2, position A3, position A4, position A5 and position A6. After the first image is scanned, all barcodes are scanned, that is, a series of numbers appears in all barcodes. At this time, the first number is equal to the total number, indicating that all barcodes are successfully scanned, and the shooting parameter of the camera is recorded, and a first scanning result of the first image is taken as a target scanning result.

At block 25, the electronic device uses the camera with the adjusted shooting parameter to photograph the barcodes, and obtains a second image.

In some embodiments of the present disclosure, after it is determined to adjust the shooting parameter from the first value to the second value, the camera is used to re-shoot a number of barcodes. If the resolution of the image captured by the camera is less than the preset resolution, the second value can be reset until the resolution of the image is greater than the preset resolution, and the image with a resolution greater than the preset resolution is used as the second image, and the second value is recorded.

At block 26, the electronic device scans the barcodes of the second image, determines a second number of scanned barcodes and the second positions of the scanned barcodes.

In some embodiments of the present disclosure, after the second image is obtained, the second image is scanned, that is, the barcodes in the second image are identified.

Figures 5, 6:
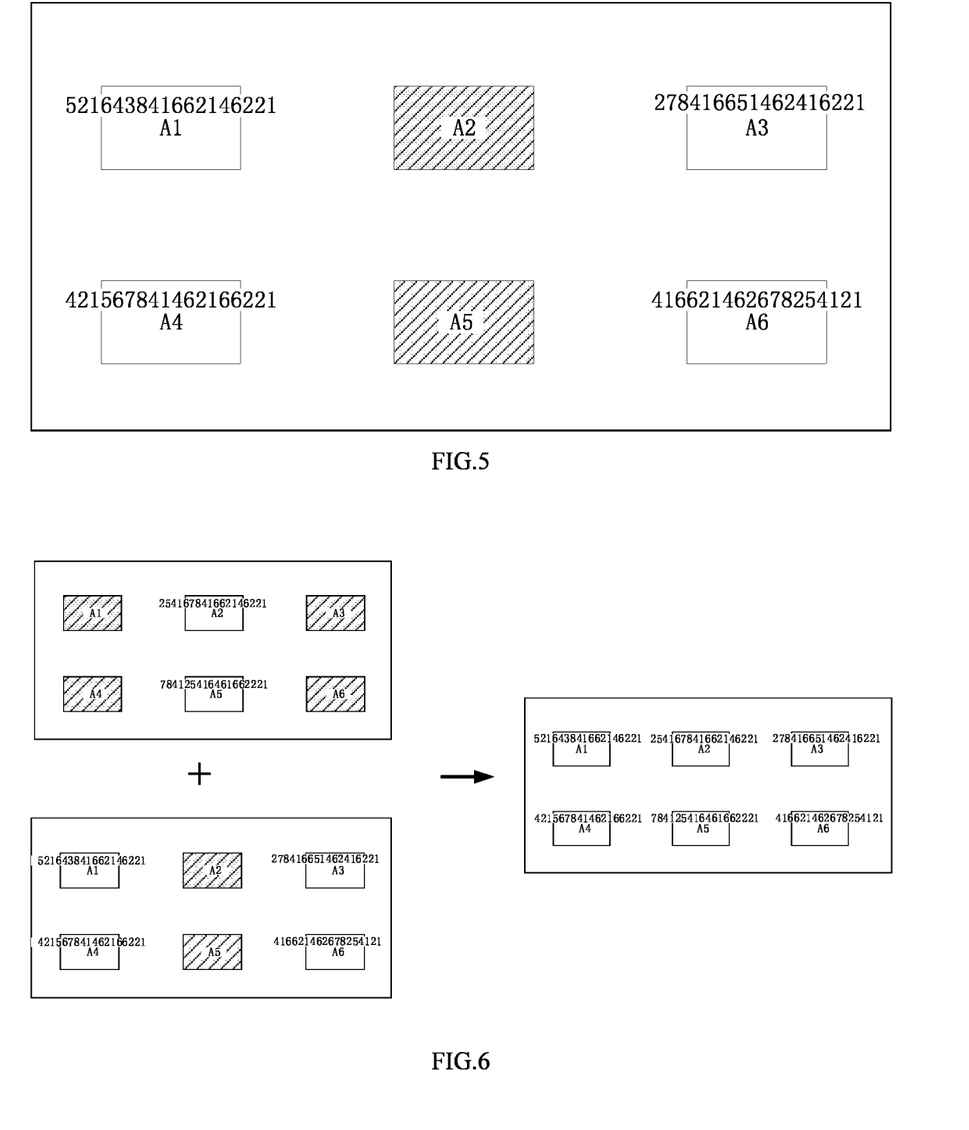
FIG. 5 is a schematic diagram of an embodiment of scanning a second image.
FIG. 6 is a schematic diagram of an embodiment of a scanning result.

For example, FIG. 5 is a schematic diagram of one embodiment of scanning a second image. As shown in FIG. 5, it is assumed that each of the barcode contains a series of numbers, and the numbers contained in each of the barcodes can be different, and the number is just an example, and corresponding information can be obtained from each of the barcodes according to the actual situation. As shown in FIG. 5, there are 6 barcodes and 6 positions corresponding to the 6 barcodes, namely position A1, position A2, position A3, position A4, position A5 and position A6. After scanning the second image, a series of numbers appear in the position A1, position A3, position A4 and position A6, therefore, the second number is 4, and the second positions includes position A1, position A3, position A4 and position A6. Since the second value is greater than the first value, assuming that position A2 and position A5 are the closest to the camera, problems such as exposure may occur, resulting in failure to identify the position A2 and the position A5.

At block 27, the electronic device calculates a first sum of the first number and the second number when the first positions are different from the second positions.

In some embodiments of the present disclosure, as shown in FIG. 3 and FIG. 5, the first positions in FIG. 4 includes position A2 and position A5, and the second positions in FIG. 5 includes position A1, position A3, position A4 and position A6, that is, the first positions are not the same as the second positions. The obtained first number is 2 and the second number is 4, and the first sum of the first number and the second number is calculated as 6.

In another embodiment of the present disclosure, it is assumed that the first positions include position A2 and position A5, and the second positions include position A1, position A3, and position A4. At this time, the first position and the second position are different, and this When the first number is 2 and the second number is 3, at this time, the first number is 2, the second number is 3, and the first sum is calculated based on the first number and the second number to be 5.

At block 28, when the first sum is equal to the total number, the electronic device determines a target scanning result according to the first image and the second image.

In some embodiments of the present disclosure, after calculating the first sum, in order to determine whether all barcodes are successfully scanned, the electronic device compares the first sum with the total number, and when the first sum is equal to the total number, the electronic device identifies the target scanning result according to the first image and the second image.

FIG. 6 is a schematic diagram of one embodiment of a scanning result, As shown in FIG. 6, determining the target scanning result according to the first image and the second image, includes: obtaining a first scanning result of the barcodes in the first image and a second scanning result of the barcodes in the second images, combining the first scanning result and the second scanning result to obtain the target scanning result.

The present embodiment can obtain different scanning results (such as the first scanning result and the second scanning result) according to an adjustment value of the shooting parameter, and combine different scanning results to obtain the target scanning result. The present embodiment can perform batch scanning for different products of a same model (the products contain multiple barcodes), and when scanning products of another model, the shooting parameters can be adjusted accordingly. After the first image is captured, the first scanning result of the first image can be stored first. After the second image is captured and the second image is scanned, the second scanning result is obtained, and then the first scanning result and the second scanning result are displayed. The shooting parameters of the first image and the second image can be set automatically or manually. This present disclosure can improve a scanning efficiency of the barcodes to a certain extent.

In other embodiments of the present disclosure, assuming that there is at least one identical position in the first positions and the second positions, a third number of the identical position is determined, a first difference between the first number and the third number is calculated. A second difference between the second number and the third number is calculated, and a second sum of the third number, the first difference and the second difference is calculated. When the second sum is equal to the total number, the electronic device determines the target scanning result according to the first image and the second image.

Figure 7:
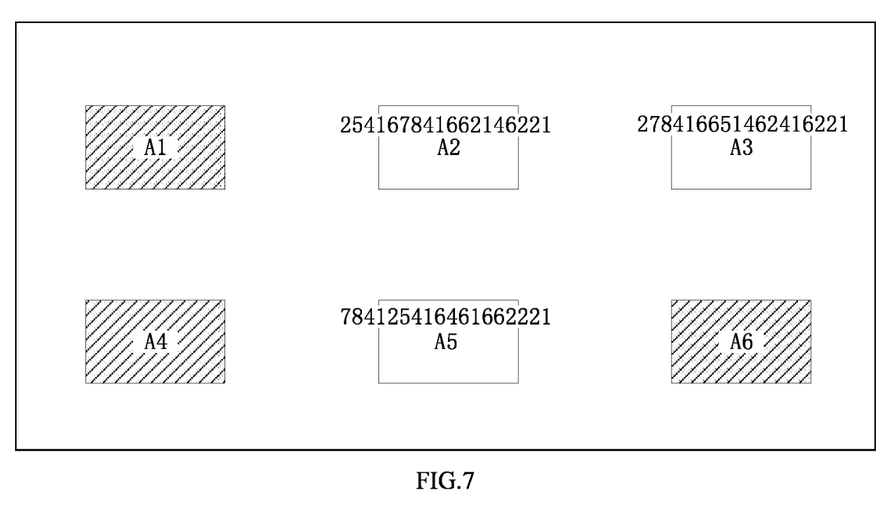
FIG. 7 is a schematic diagram of an embodiment of a scanning images.

For example, FIG. 7 is a schematic diagram of one embodiment of a scanning images. As shown in FIG. 7, the scanned first positions include position A2, position A3 and position A5, as shown in FIG. 5, the scanned second positions include position A1, position A3, position A4 and position A6. In the first positions and in the second positions, the position A3 is repeatedly scanned, therefore, the total number is 6, the third number is 1, the first number is 3, and the second number is 4. Thus, the first difference is calculated as 2 according to the first number and the third number, and the second difference is calculated as 4 according to the second number and the third number, and the second sum is calculated as 6 according to the third number, the first difference and the second difference.

As the second sum 6 is equal to the total number 6, then, according to the first image and the second image, the electronic device determines the target scanning result. Referring to FIG. 7 and FIG. 5, the target scanning result (as shown in FIG. 4) is obtained.

In other examples, the first position may include position A2, position A3, position A5, and position A6, and the second positions may include position A1, position A3, position A4, and position A6. Then, position A3 and position A6 are repeatedly scanned, then the electronic device determines that the third number is 2, the first number is 4, and the second number is 4, the first difference is 2, the second difference is 2, and the second sum is 6.

The above embodiments are just examples, and the third quantity can be determined according to an actual scanning situation.

In other embodiments of the present disclosure, if the second sum is less than the total number, it indicates that a scanning process of all barcodes has not been completed. At this time, it is necessary to further adjust the shooting parameter, and the shooting parameter is adjusted from the second value to a third value, and the third value is greater than the second value, that is, increasing the multi-angle light intensity for better shooting and scanning. After adjusting the shooting parameter to the third value, the barcodes are re-scanned until all barcodes are successfully scanned.

In one embodiment, the shooting parameter can be adjusted accordingly. After the first image is captured, the first scanning result of the first image can be stored first. After capturing the second image and scanning the second image, the second scanning result is obtained. After obtaining the first scanning result and the second scanning result, determine whether all barcodes complete scanning. When all barcodes not completing scanning, the electronic device adjusts the shooting parameter until all barcodes completing scanning. When all barcodes completing scanning, the electronic device records product model of products corresponding to the barcodes and corresponding shooting parameter. When scanning another product of the same model, the products of the same model can be scanned according to the obtained shooting parameters, so as to improve the efficiency of obtaining the information of the barcodes in batches.

Figure 8:
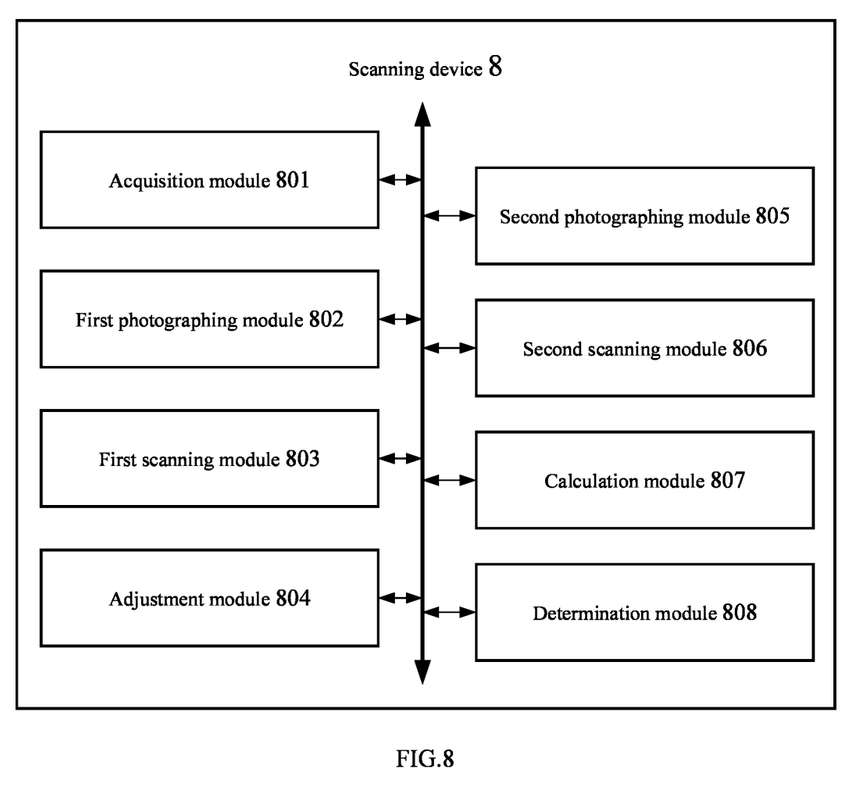
FIG. 8 is a structural diagram of an embodiment of a scanning device.

FIG. 8 is a structural diagram of one embodiment of a scanning device. As shown in FIG. 8, in one embodiment, the scanning device 8 can be divided into multiple functional modules according to the functions it performs. The functional modules of the scanning device 8 includes an acquisition module 801, a first photographing module 802, a first scanning module 803, an adjustment module 804, a second photographing module 805, a second scanning module 806, a calculation module 807, and a determination module 808.

The acquisition module 801 obtains a total number of barcodes.

The first photographing module 802 uses the camera to photograph the barcodes to obtain a first image.

The first scanning module 803 scans the first image, determines a first number of scanned barcodes and first positions of the scanned barcodes.

The adjustment module 804 adjusts the shooting parameter of the camera from a first value to a second value when the first number is less than the total number.

The second photographing module 805 uses the camera with the adjusted shooting parameter to photograph the barcodes, and obtains a second image.

The second scanning module 806 scans the barcodes of the second image, determines a second number of scanned barcodes and the second positions of the scanned barcodes.

The calculation module 807 calculates a first sum of the first number and the second number when the first positions are different from the second positions.

The determination module 808 determines a target scanning result according to the first image and the second image when the first sum is equal to the total number.

In some embodiments, determining the target scanning result according to the first image and the second image, includes: obtaining a first scanning result of the barcodes in the first image and a second scanning result of the barcodes in the second images, combines the first scanning result and the second scanning result to obtain the target scanning result.

In some embodiments, when determining at least one identical position in the first positions and the second positions, a third number of the identical position is determined; a first difference between the first number and the third number is calculated; a second difference between the second number and the third number is calculated; a second sum of the third number, the first difference and the second difference is calculated; when the second sum is equal to the total number, the target scanning result is determined according to the first image and the second image.

In some embodiments, when the second sum is less than the total number, the shooting parameter is adjusted from the second value to a third value, and the barcodes are re-scanned until all barcodes are successfully scanned.

In some embodiments, when the first number is equal to the total number, the first scanning result of the first image is used as the target scanning result.

In some embodiments, obtaining the total number of barcodes, includes: using a preset target detection algorithm to identify the barcodes, using rectangular frames to select or frame each of the barcodes; calculating a number of all rectangular frames as the total number of the barcodes.

In some embodiments, the shooting parameter includes multi-angle light intensity values.

Please continue to refer to FIG. 1, in one embodiment, the storage 12 may be an internal memory of the electronic device 1, that is, a memory set in the electronic device 1. In other embodiments, the storage 12 may also be an external memory of the electronic device 1, that is, a memory external to the electronic device 1.

In some embodiments, the storage 12 is used to store program codes and various data, and realize high-speed and automatic program or data access during the operation of the electronic device 1.

The storage 12 may include a random access memory, and may also include a non-volatile memory, such as a hard disk, an internal memory, a plug-in hard disk, a smart media card (SMC), a secure digital (SD) card, a flash card, at least one magnetic disk storage device, a flash memory device, or other volatile solid-state storage device.

In one embodiment, the processor 13 may be a Central Processing Unit (CPU), a general-purpose processor, a digital signal processors (DSP), an Application Specific Integrated Circuit (ASIC), a Field-Programmable Gate Array (FPGA) or other programmable logic devices, discrete gate or transistor logic devices, discrete hardware components, etc. The general-purpose processor can be a microprocessor, or any other conventional processor, etc.

When the program codes and various data in the memory 12 are implemented in the form of software function units and sold or used as independent products, they can be stored in a computer-readable storage medium. The present disclosure implements all or part of the processes in the methods of the above embodiments, such as the scanning method, which can also be completed by instructing related hardware by a computer program, and the computer program can be stored in a computer-readable storage medium. When the computer program is executed by the processor, it can realize the steps of the above-mentioned various method embodiments. In one embodiment, the computer program includes computer program code, which may be in the form of source code, object code, executable files, or some intermediate form or the like. The computer readable medium may include any entity or device capable of carrying the computer program code, a recording medium, a U disk, a removable hard disk, a magnetic disk, an optical disk, a computer memory, or a read-only memory (ROM).

It can be understood that the module division described above is a logical function division, and there may be other division methods in actual implementation. In addition, each functional module in each embodiment of the present disclosure may be integrated into a same processing unit, or each module may exist separately physically, or two or more modules may be integrated into a same unit. The above-mentioned integrated modules can be implemented in the form of hardware, or in the form of hardware plus software function modules.

The above description only represents some embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A scanning method, applied in an electronic device, the method comprising:
   obtaining a total number of objects;
   using a camera to photograph the objects, and obtaining a first image;
   scanning the first image, and determining a first number of first scanned barcodes and first positions of the first scanned barcodes;
   adjusting, when the first number is less than the total number, a shooting parameter of the camera from a first value to a second value;
   using the camera with the adjusted shooting parameter to photograph the objects, and obtaining a second image;
   scanning the second image, and determining a second number of second scanned barcodes and second positions of the second scanned barcodes;
   calculating a first sum of the first number and the second number when the first positions are different from the second positions; and
   determining, when the first sum is equal to the total number, a target scanning result according to the first image and the second image,
   wherein determining the target scanning result according to the first image and the second image comprises:
   obtaining a first scanning result of the barcodes in the first image;
   obtaining a second scanning result of the barcodes in the second image; and
   combining the first scanning result and the second scanning result to obtain the target scanning result.

2. The scanning method as recited in claim 1, the method further comprising:
   determining, when determining at least one identical position in the first positions and the second positions, a third number of the at least one identical position;
   calculating a first difference between the first number and the third number;
   calculating a second difference between the second number and the third number;
   calculating a second sum of the third number, the first difference, and the second difference; and
   determining, when the second sum is equal to the total number, the target scanning result according to the first image and the second image.

3. The scanning method as recited in claim 2, the method further comprising:

adjusting, when the second sum is less than the total number, the shooting parameter from the second value to a third value, and re-scanning the objects until the objects are all successfully scanned.

4. The scanning method as recited in claim 1, the method further comprising:
using, when the first number is equal to the total number, the first scanning result of the first image as the target scanning result.

5. The scanning method as recited in claim 1, obtaining the total number of the objects further comprising:
using a preset target detection algorithm to identify the objects, and using rectangular frames to select each of the objects; and
calculating a number of the rectangular frames as the total number of the objects.

6. The scanning method as recited in claim 1, wherein the shooting parameter is provided with multi-angle light intensity values.

7. An electronic device comprising:
a processor; and
a non-transitory storage medium, coupled to the processor, that stores a plurality of instructions, which cause the processor to:
obtain a total number of objects;
use a camera to photograph the objects, and obtain a first image;
scan the first image, and determine a first number of first scanned barcodes and first positions of the first scanned barcodes;
adjust, when the first number is less than the total number, a shooting parameter of the camera from a first value to a second value;
use the camera with the adjusted shooting parameter to photograph the objects, and obtain a second image;
scan the second image, and determine a second number of second scanned barcodes and second positions of the second scanned barcodes;
calculate a first sum of the first number and the second number when the first positions are different from the second positions; and
determine, when the first sum is equal to the total number, a target scanning result according to the first image and the second image,
wherein determining the target scanning result according to the first image and the second image comprises:
obtaining a first scanning result of the barcodes in the first image;
obtaining a second scanning result of the barcodes in the second image; and
combining the first scanning result and the second scanning result to obtain the target scanning result.

8. The electronic device as recited in claim 7, wherein the plurality of instructions are further configured to cause the processor to:
determine, when determining at least one identical position in the first positions and the second positions, a third number of the at least one identical position,
calculate a first difference between the first number and the third number,
calculate a second difference between the second number and the third number,
calculate a second sum of the third number, the first difference and the second difference, and
determine, when the second sum is equal to the total number, the target scanning result according to the first image and the second image.

9. The electronic device as recited in claim 8, wherein the plurality of instructions are further configured to cause the processor to:
adjust, when the second sum is less than the total number, the shooting parameter from the second value to a third value, and re-scan the objects until the objects are all successfully scanned.

10. The electronic device as recited in claim 7, wherein the plurality of instructions are further configured to cause the processor to:
use, when the first number is equal to the total number, the first scanning result of the first image as the target scanning result.

11. The electronic device as recited in claim 7, wherein the plurality of instructions are further configured to cause the processor to:
use a preset target detection algorithm to identify the objects, and use rectangular frames to select each of the objects, and
calculate a number of the rectangular frames as the total number of the objects.

12. The electronic device as recited in claim 7, wherein the shooting parameter comprises multi-angle light intensity values.

13. A non-transitory storage medium having stored thereon instructions that, when executed by at least one processor of an electronic device, causes the least one processor to execute instructions of a scanning method, the scanning method comprising:
obtaining a total number of objects;
using a camera to photograph the objects, and obtaining a first image;
scanning the first image, and determining a first number of first scanned barcodes and first positions of the first scanned barcodes;
adjusting, when the first number is less than the total number, a shooting parameter of the camera from a first value to a second value;
using the camera with the adjusted shooting parameter to photograph the objects, and obtaining a second image;
scanning the second image, and determining a second number of second scanned barcodes and second positions of the second scanned barcodes;
calculating a first sum of the first number and the second number when the first positions are different from the second positions; and
determining, when the first sum is equal to the total number, a target scanning result according to the first image and the second image,
wherein determining the target scanning result according to the first image and the second image comprises:
obtaining a first scanning result of the barcodes in the first image;
obtaining a second scanning result of the barcodes in the second image; and
combining the first scanning result and the second scanning result to obtain the target scanning result.

14. The non-transitory storage medium as recited in claim 13, the scanning method further comprising:
determining, when determining at least one identical position in the first positions and the second positions, a third number of the at least one identical position;
calculating a first difference between the first number and the third number;
calculating a second difference between the second number and the third number;

calculating a second sum of the third number, the first difference and the second difference; and determining, when the second sum is equal to the total number, the target scanning result according to the first image and the second image.

15. The non-transitory storage medium as recited in claim 14, the scanning method further comprising:

adjusting, when the second sum is less than the total number, the shooting parameter from the second value to a third value, and re-scanning the objects until the objects are all successfully scanned.

16. The non-transitory storage medium as recited in claim 13, the scanning method further comprising:

using, when the first number is equal to the total number, the first scanning result of the first image as the target scanning result.

17. The non-transitory storage medium as recited in claim 13, the scanning method further comprising:

using a preset target detection algorithm to identify the objects, and using rectangular frames to select each of the objects; and calculating a number of the rectangular frames as the total number of the objects.

* * * * *